March 11, 1930.  J. PARKER  1,750,425
ENDLESS CONVEYER OR ELEVATOR
Filed March 7, 1929  3 Sheets-Sheet 2
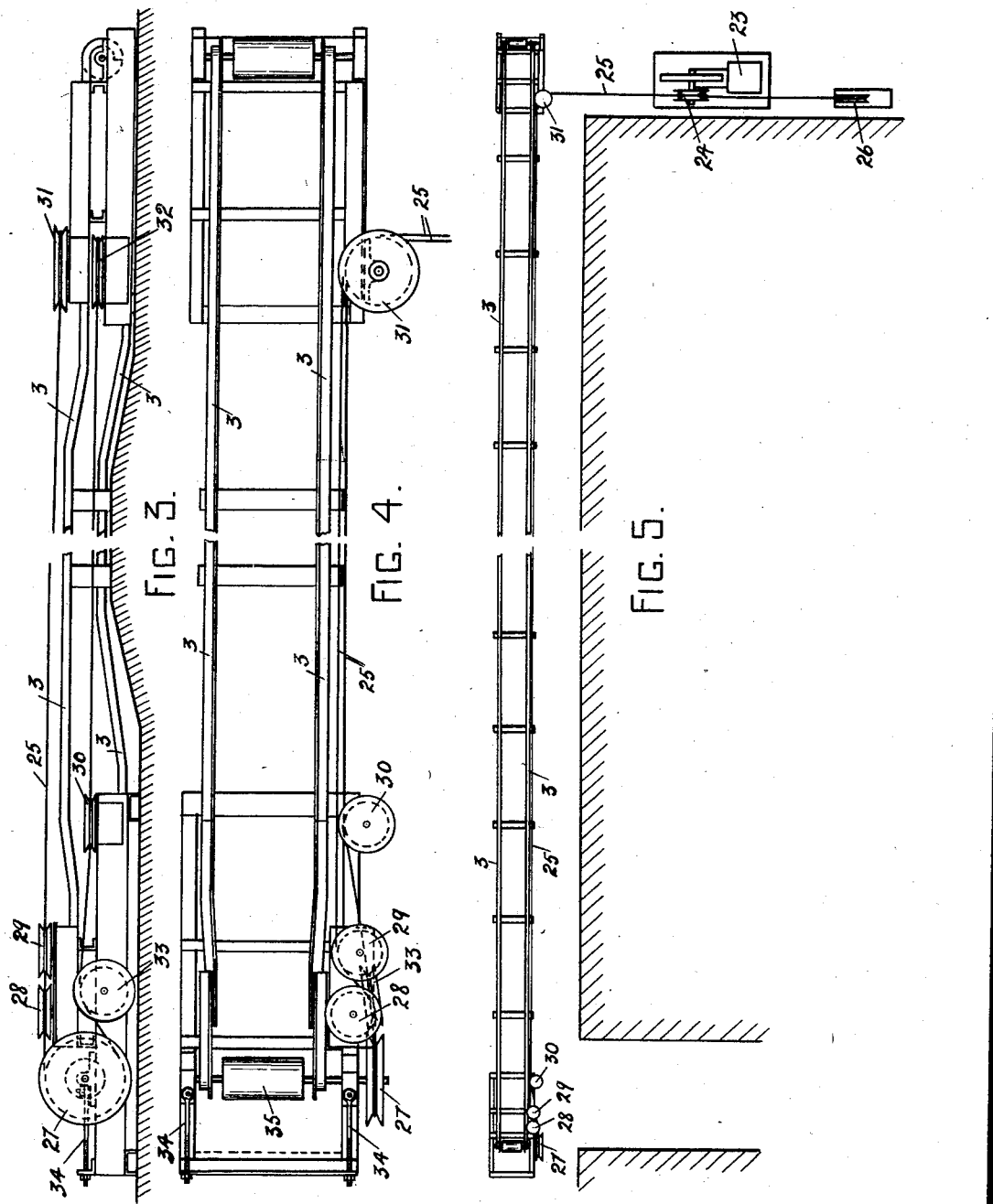

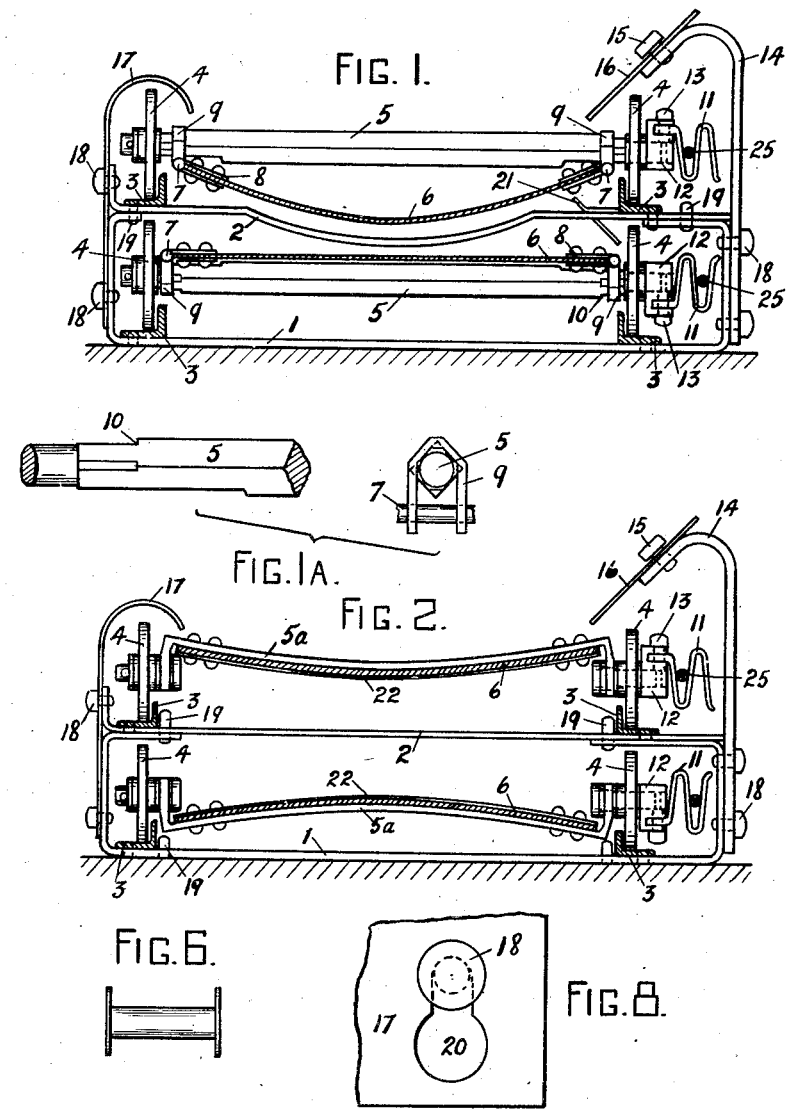

March 11, 1930. J. PARKER 1,750,425
ENDLESS CONVEYER OR ELEVATOR
Filed March 7, 1929 3 Sheets-Sheet 3
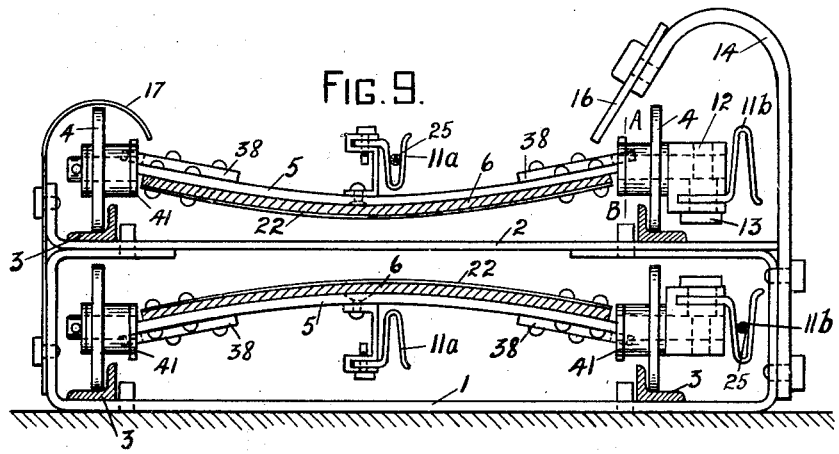
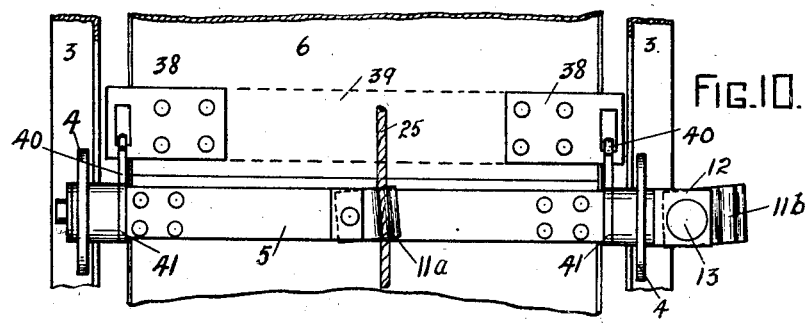
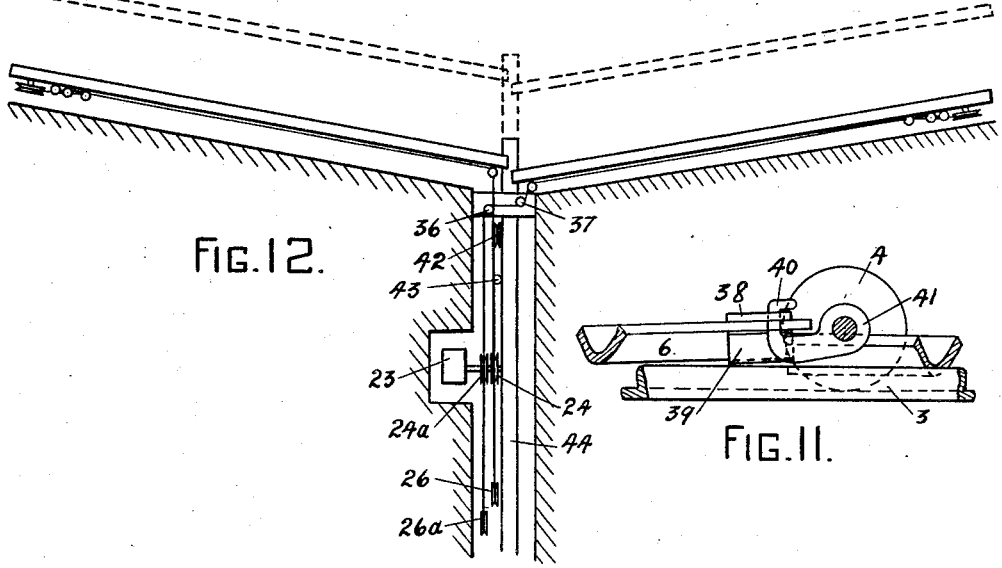
Inventor
Joseph Parker
By Knight &co
Attorneys Patented Mar. 11, 1930

1,750,425

UNITED STATES PATENT OFFICE

JOSEPH PARKER, OF COWDENBEATH, SCOTLAND

ENDLESS CONVEYER OR ELEVATOR

Application filed March 7, 1929, Serial No. 345,061, and in Great Britain March 13, 1928.

This invention has reference to conveyers or elevators for transporting minerals or other goods.

It is one of the objects of the present invention to provide an improved construction of conveyer for use along the line of the face of work, such as the working face of a colliery, or for use in the road or gateway leading directly from the working face.

A further object of my invention is to combine an endless belt or moving platform with an endless driving cable or cables in such a manner that the belt or platform is not in any way supported by the driving cables, but is wholly supported by means independent of the driving rops or cables, such as by the provision, at intervals along the length of the belt or platform of means such as wheels or rollers which run upon a fixed track.

These and other objects of the present invention will appear from the following description in conjunction with the accompanying drawings illustrating my invention.

Fig. 1 is a cross-sectional view of a coal face conveyer having a troughed upper run and a flat return run.

Fig. 1a shows details thereof to a larger scale.

Fig. 2 shows a second construction of conveyer in similar view to Fig. 1.

Fig. 3 is a side diagrammatic view, Fig. 4 a plan and Fig. 5 a plan view to a smaller scale illustrating the arrangement for facilitating the movement of the conveyer and driving rope forwards as the face of work advances.

Fig. 6 is a detail view of a reel for the driving rope.

Fig. 7 is a side view of the loading side of the conveyer shown in Figs. 1, 2 and 9.

Fig. 8 is a detail view of a stud and keyhole slot connection.

Fig. 9 illustrates a further construction of conveyer in cross section.

Fig. 10 is a plan view and Fig. 11 a side view illustrating a manner of joining the belt sections together.

Fig. 12 is a diagrammatic plan view showing an arrangement for driving two conveyers from a single driving motor.

Referring to the construction shown in Fig. 1, the belt 6 which is troughed in the upper run is clamped at the edges between hinged plates 8 which are capable of turning on pins 7 carried by sliding collars or hangers 9 (see Fig. 1a) which are slidable along axles 5 between wheels 4 on the axles and shoulders or stops 10 formed on the axles 5 by filing away a portion of the corners of the square axles. The stops 10 serve to limit the troughing or sagging at the centre of the belt 6 and a strip of thin flexible steel may extend across and under the belt between the hinged plates or clamps 8. The wheels or rollers 4 run on angle irons 3 which form a fixed track and which are supported at suitable intervals by frames formed of steel plates 1 and 2 bent as shown. Studs or pins 19 secured either to the lower frame plate 1 or the upper plate 2 or angle-iron 3 register with holes in the other parts to detachably secure the sections together. The central part of the upper frame plates 2 is bent downwards as shown to clear the troughed belt and to allow the belt to run as near to the ground or floor as possible and thus give the maximum room in low coal seams for the mineral carried by the belt.

On passing around the end drums (not shown), the belt 6 can flatten out, as the hangers 9 slide outwards on the axles, while the clamps 8 rock upon the supporting pins 7.

The conveyer is driven by the provision of the duplex rope grips or clips 11 which can turn slightly upon pins 13 carried by a block 12 which is fixed to the axle 5.

Along the coal face or loading side of the conveyer are fitted plates 17 (see also Fig. 7) attached to the frame plates 1 and 2 and curved over the rollers 4 as shown. The plates 17 are attached to the frame plates by the provision of studs or pins 18 which enter key-hole slots 20 (see Fig. 8). The plates 17 serve to protect workmen from contact with moving parts of the conveyer and also serve to prevent materials from being thrown upon the lower or return run of the belt.

To arrest any material which is thrown over the conveyer belt and to return such material to the belt, curved bars 14 may be fixed to the frame plates by stud and keyhole slots in a similar manner to that above described, the bars 14 serving to support inclined plates 16 which extend along the conveyer at the opposite side to the coal face or loading side. The plates 16 may be secured by means of studs 15 engaging key-hole slots.

In order to prevent any material which passes between the lower edge of the plates 16 and the edge of the belt from falling upon the lower part of the belt, deflecting plates 21 may be provided. These may have a portion at each end cut and folded up at a suitable angle for securing the deflecting plates to the conveyer frame. The plates 21 will deflect outwards from the conveyer any material which passes over the edge of the belt.

Fig. 2 shows a conveyer constructed similarly to that shown in Fig. 1 except that the belt is clamped between a curved flat bar $5^a$ (which carries the axles of the rollers 4), and a thin strip of flexible steel 22 provided below the belt. In this form, on passing around the drums at either end, the lowest portion of the belt near the centre would press on the drum, but the edges would be drawn outwards by the axles, which would be guided around the drum by the pressure of the rollers on the track or rail.

In both forms shown in Figs. 1 and 2 the drive in both the upper and return runs is communicated at the side away from the working face by means of the clips 11. These types are suitable in cases where the driving force required is not excessive.

Another form is shown in Fig. 9, in which the belt is clamped between a thin flexible strip of steel 22 and an axle 5 above the latter being formed by flattening and curving a round bar which carries the wheels or rollers at its outer extremities. In this case the drive on the upper or loaded side of the belt is through a single clamp $11^a$, pivoted so as to be able to grip the rope, and secured near the centre of the axle as shown. The drive on the lower run is transmitted by a single clip $11^b$ attached to the axle as shown on the outer side of the conveyer.

A similar method of driving may, if desired, be applied to the forms shown in Figs. 1 and 2.

In order that the rope-driven conveyer when used at a coal face may be moved forward with facility as the face of the work advances the component parts of the conveyer are all fitted and registered together by the use of stud and key-hole slot connections as already described, without the use of bolts and nuts or other removable couplings having loose parts which are liable to be lost.

The arrangement for handling the rope when moving the conveyer forward is illustrated in Figs. 3, 4 and 5. The numeral 23 designates the driving motor having a driving pulley 24 over which the rope 25 passes to a tail pulley or return pulley 26. The rope 25 on the upper or loaded side of the belt after passing around a pulley 27 passes over a pulley 28 and pulley 29 and is clipped where the track 3 rises above a pulley 30. At the delivery end, the track 3 descends, and the rope is unclipped and passes around a pulley 31 and thence goes to the driving pulley 24 of the motor 23. After going round the pulley 24 two or three times, the rope goes to the return pulley 26 and from thence it is led back and goes around a pulley 32. Then where the track 3 rises up on the underside of the belt, the rope is clipped for the return run. Near the other end the track 3 dips and the rope is de-clipped and passes over pulleys 30 and 33 on to pulley 27. At this end there are two screws 34 which enable the shaft which carries the belt drum 35 and the pulley 27 to be adjusted to tighten or slacken the belt and rope. When the screws 34 are slackened, the rope can be taken off from all the pulleys 27, 28, 29, 30 and 33 and is not fouled by any spindles or other parts in the loop or bend. In the same way the rope can be taken off the pulleys 31 and 32.

Referring now to Fig. 12, which shows an arrangement for driving two conveyers, forming a double unit, from one motor and assuming that the conveyers have to be moved forward from the position shown by the full lines into that shown by the dotted lines the screws 34 would be slackened and the rope taken off the pulleys as explained above. The conveyers would then be taken to pieces and the parts put into the space between the full- and dotted-line positions. The loop of the rope at the return end would then be put into a catch on a reel, such as shown in Fig. 6, and this reel would be rolled along the path shown by the full lines until the delivery end was reached, when the reel carrying the rope would be moved transversely into the position formed by the dotted lines, and then rolled back to the return end, thus placing the rope in the required position. The operation would be repeated for the other conveyer. The conveyers would then be built up in segments, the ropes inserted in the clips, when the whole would be ready to work in the new position. As the face advanced, the tail pulley 26 (or 26 and $26^a$ in Fig. 12) would be advanced towards the motor 23.

To drive the two conveyers from the same motor, two driving pulleys 24 and $24^a$ would be mounted on the driving shaft, and each operated by a separate clutch.

The conveyer shown to the left of Fig. 12 is driven as explained above with reference to Fig. 5, while that shown to the right requires that the rope, after passing around the driving pulley $24^a$ and the return pulley $26^a$ should pass around guide pulleys 36 and 37 suitably placed, and thence pass on to the conveyer pulleys.

To enable the belt to be moved forwards, it is divided into segments of suitable length, and these segments are connected together by hooks and links as shown in plan in Fig. 10. Fig. 11 is a side view of the joint looking to the left of the section marked AB in Fig. 9. Near the end of one segment, slotted plates 38 are riveted through the belt to a flexible strip 39 which stretches across and below the belt. The slotted plates 38 are passed over hooks 40 of catches 41 mounted on the axle pins which carry the rollers 4. To prevent mineral from falling through the belt at the joint, the two segments of the belt are made to overlap each other.

In Fig. 12 only the return pulley 42 and a guide pulley 43 are shown of the conveyer 44 used in the gate, which is assumed to be driven by a separate motor. The gate end conveyer 44, as well as the two face conveyers can, however, be driven from the same motor. In this case, the driving pulley for the gate end conveyer would be keyed to the driving shaft of the motor 23 as there would be no need for the face conveyers being run when the gate end conveyer is stopped. The two driving pulleys for the face conveyer would be actuated by separate clutches which could be of the dog-clutch type; but a preferable arrangement consists in having them driven from the shaft by separate magnetic clutches, the current for actuating these clutches being obtained from a small direct-current generator driven by the main motor. These motors would be controlled by the attendant where the face conveyers discharge, by means of a three-core cable having two positive leads and one common return, and single-pole switches to control the current to each magnetic clutch.

I claim:

1. A conveyer or elevator comprising an endless belt, a track, rollers movable along said track, axles supporting said rollers, rope grips attached at intervals to the face of the belt and rope grips attached at intervals to the side of the belt.

2. A conveyer or elevator comprising an endless belt, rope grips attached at intervals to the belt, rollers mounted upon axles supporting the belt, an endless driving rope for engaging said grips, and means for enabling the conveyer to be moved parallel to itself comprising adjustable guide pulleys around which the rope passes at one end of the conveyer, said guide pulleys being so arranged that, when the rope is slackened by adjustment of the pulleys, the rope can be detached from the pulleys without fouling, so that the rope may be reeled up.

3. A conveyer or elevator as specified in claim 2 in combination with guide pulleys at the other end of the conveyer, a driving motor and a movable return pulley, said rope passing over the guide pulleys to said motor and from thence to the return pulley, adjustment of which enables the conveyer to be displaced.

4. A duplex face conveyer consisting of two face conveyers as specified in claim 2, and a single driving motor adapted to drive both conveyers and situated in a roadway extending from the junction of the two conveyers.

5. A conveyer comprising, in combination, an endless belt, cross members at intervals along the belt and attached to the marginal edges thereof to support the belt in a troughed condition, rollers mounted on the ends of said cross members, angle iron tracks for supporting said rollers upon the upper and lower runs of the belt, a duplex rope grip pivotally mounted at one end of each cross member upon a vertical pivot, said rope grip consisting of reversely arranged converging jaws, a sole plate supporting the lower track, a frame plate supporting the upper track and mounted upon upturned sides of the sole plate, and pin and hole connections for detachably connecting said sole plate, frame plate, and tracks.

6. A conveyer comprising, in combination, an endless belt, cross members attached at intervals to the belt, rollers on said cross members, tracks for supporting said rollers upon the upper and lower runs of the belt, duplex rope grips attached at intervals to the belt and each consisting of reversely arranged converging jaws, end drums over which the belt travels, one of said drums being adjustable inwards, a rope pulley turning with said adjustable drum, an endless driving rope passing over said pulley, a motor-driven sheave for driving said rope, guide pulleys for guiding said rope into and out of engagement with said rope grips, and a return pulley over which said rope passes, said return pulley being adjustable towards the belt, to enable the conveyer to be advanced in a direction parallel to itself.

7. A conveyer or elevator comprising, in combination, a track, rollers movable along the track, axles connected to said rollers, overlapping belt sections attached to said axles, rope grips attached to said belt sections, hooked members pivoted on one of said axles at one of the overlapping ends of adjacent belt sections, and slotted members on the other overlapping end of said adjacent belt sections and adapted to be engaged by the hooked members, thereby to provide an endless belt.

The foregoing specification signed at Glasgow this 26th day of February 1929.

JOSEPH PARKER.